United States Patent [19]

Carr

[11] 4,068,043
[45] Jan. 10, 1978

[54] PUMP BATTERY SYSTEM
[75] Inventor: Peter Carr, Utica, Mich.
[73] Assignee: Energy Development Associates, Madison Heights, Mich.
[21] Appl. No.: 776,511
[22] Filed: Mar. 11, 1977
[51] Int. Cl.² .............................................. H01M 8/04
[52] U.S. Cl. .................................................... 429/22
[58] Field of Search .................................... 429/22, 27
[56] References Cited
U.S. PATENT DOCUMENTS
3,713,888  1/1973  Symons ................................. 429/70

Primary Examiner—John H. Mack
Assistant Examiner—H. A. Feeley
Attorney, Agent, or Firm—Ostrolenk, Faber, Gerb & Soffen

[57] ABSTRACT

A circulating electrolyte type battery is disclosed in which the cell containing two electrodes is divided into compartments by a porous separator and in which the outlet lines from the two compartments to the electrolyte storage reservoir have different resistance to electrolyte flow.

10 Claims, 1 Drawing Figure

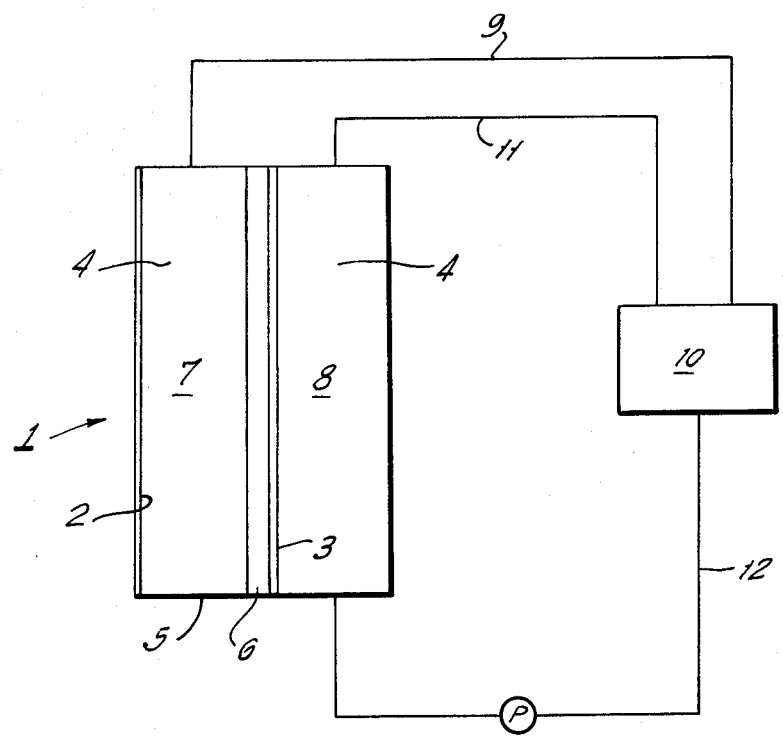

PUMP BATTERY SYSTEM

Circulating electrolyte type battery systems are known, especially those of the type using a halogen hydrate as the source of halogen. See, e.g., U.S Pat. No. 3,713,888 which is hereby incorporated by reference. A preferred system is of the zinc/chlorine/ zinc chloride type. During the charging of such a battery, zinc is plated out of the zinc chloride electrolyte onto one of the electrodes and chlorine gas is formed at the other electrode. During discharge, the plated zinc goes back into the electrolyte solution and chlorine gas is consumed at the other electrode.

To maximize coulombic efficiency in a system such as that described, the flux of dissolved chlorine reaching the zinc electrode should be minimized during both charge and discharge. Dissolved chlorine at the zinc electrode surface constitutes the major coulombic efficiency loss in the zinc-chlorine battery. The present invention provides a simple and efficient system in which this chlorine flux is significantly reduced on charge while still retaining the necessary flow through characteristics of the chlorine electrode in the cell on discharge.

The sole FIGURE depicts a schematic view of a preferred embodiment of the present invention showing electrodes interconnected in a hydraulic circuit with an electrolyte reservoir. The FIGURE shows a battery cell 1 which contains two electrodes 2, 3, and electrolyte 4 within a suitable housing 5. The electrodes 2, 3 and electrolyte 4 can be any of the electrodes and the electrolyte described in the aforementioned U.S. Pat. No. 3,713,888. Electrode 2 is the zinc electrode and electrode 3 is the chlorine electrode.

By means of a porous separator 6, cell 1 is divided into a zinc compartment 7 and a chlorine compartment 8. The separator is preferably a porous valve metal separator as exemplified by Grould No. 6525 porous titanium. In the embodiment shown, chlorine electrode 3 is present in the form of a thin noble metal or alloy or oxide thereof catalytic layer on the backside of separator 6, i.e., the side facing away from zinc electrode 2.

A unique way for applying the thin noble metal catalytic layer to one face of the porous valve metal separator is to dissolve the catalyst in a solvent and then spray or paint the catalyst solution on the porous valve metal substrate which has been preheated to a temperature sufficiently above the boiling point of the catalyst solvent so that the solvent evaporates rapidly on contact with the substrate. The flashing of the solvent prevents the catalyst solution from advancing to the other side of the porous substrate by capillary action and the resulting one side noble metal catalyst coated valve metal substrate is sufficiently porous to allow the flow of electrolyte therethrough.

A return conduit 9 for electrolyte is provided and interconntects zinc compartment 7 of cell 1 with an electrolyte reservoir 10. Similarly, a return conduit 11 for electrolyte interconnects chlorine compartment 8 of cell 1 with reservoir 10. The resistance to electrolyte flow of conduit 9 is greater than the resistance of conduit 11. This can be accomplished through many procedures known in the art as for example, by providing conduit 9 with a greater inner diameter than the inner diameter of conduit 11 and alternatively (or concurrently) positioning conduit 9 so that it is above conduit 11 thereby requiring a greater resistance to flow due to gravity to be overcome. Electrolyte in reservoir 10 is returned to cell 1 through a return conduit 12 which has a variable speed pump associated therewith. Although not essential, conduit 12 preferably interconnects with cell 1 in chlorine compartment 8.

During charging of the battery, the pump in return conduit 12 is adjusted such that the electrolyte flow rate into the cell is sufficient to force electrolyte through conduit 11 but insufficient to cause electrolyte to be conveyed from zinc compartment 7 through conduit 9 into reservoir 10. As a result, the anode and cathode products are separated. During discharge, the pump can be adjusted such that the overall flow rate is greater than during charge and/or the resistance to flow in conduits 9 and 11 can be changed so that there is a distinct flow through the porous separator 6 from chlorine compartment 8 into zinc compartment 7. As a result, the performance advantages of a flow-through chlorine electrode are realized. The main advantage is that sufficient dissolved chlorine (chlorine only dissolves to about 3 gm/liter in the zinc chloride electrolyte) can diffuse to the active surface in a flow through electrode to sustain practical discharge current densities at a good voltaic performance. The amount of flow through should be directly tailored to the current being down from the cell. During charge, the chloride concentration is sufficiently high at all times to preclude mass transport problems even in the non-flow through mode. It will thus be recognized by those skilled in this art that efficiency of the system is maximized during both charge and discharge when the instant system is used.

Various changes and modifications can be made in the present invention without departing from the spirit and scope thereof. The various embodiments disclosed herein were for the purpose of further illustrating the invention but were not intended to limit it.

I claim:

1. An adjustable flow battery system comprising a cell containing two electrodes and a porous separator therebetween so as to define first and second compartments, an electrolyte reservoir, a first conduit interconnecting said first compartment to said reservoir, a second conduit interconnecting said second compartment to said reservoir, said first conduit having a greater resistance to flow of electrolyte than said second conduit, a third conduit interconnecting said reservoir and said cell, and a variable speed pumping means associated with said third conduit, whereby said system is adapted to separate anode and cathode products on charge while permitting distinct flow through said porous separator on discharge.

2. The battery system of claim 1 wherein said first conduit has a greater inner diameter than said second conduit.

3. The battery system of claim 1 wherein said first conduit achieves a height greater than that achieved by said second conduit whereby electrolyte in said first conduit must overcome greater gravity forces in order to flow to said reservoir.

4. The battery system of claim 3 wherein said first conduit has a greater inner diameter than the inner diameter of second conduit.

5. The battery system of claim 1 wherein said porous separator is a porous valve metal.

6. The battery system of claim 5 wherein said metal is titanium.

7. The battery system of claim 1 wherein the electrode in the second compartment is present in the form of a coating on said porous separator.

8. The battery system of claim 7 wherein said third conduit interconnects with said cell in said second compartment.

9. The battery system of claim 8 wherein said porous separator is a porous valve metal and said electrode coating on said porous separator is a noble metal or alloy or oxide thereof.

10. The battery system of claim 9 wherein said valve metal is titanium and wherein said noble metal or alloy or oxide thereof is ruthenium oxide.

* * * * *